United States Patent
Cheng et al.

(10) Patent No.: US 9,444,660 B2
(45) Date of Patent: Sep. 13, 2016

(54) SIMPLIFIED AND EFFECTIVE OFFSET CALIBRATION CIRCUIT FOR RXLOS IN SERDES

(71) Applicant: LSI Corporation, San Jose, CA (US)

(72) Inventors: Shu Dong Cheng, Shanghai (CN); Ming Chen, Shanghai (CN); Yan Xu, Shanghai (CN); Dong Hui Wang, Shanghai (CN); Jun Tian, Shangai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/280,295

(22) Filed: May 16, 2014

(65) Prior Publication Data
US 2015/0312068 A1  Oct. 29, 2015

Related U.S. Application Data
(60) Provisional application No. 61/985,206, filed on Apr. 28, 2014.

(51) Int. Cl.
*H04B 3/46* (2015.01)
*H04B 17/00* (2015.01)
*H04Q 1/20* (2006.01)
*H04L 25/06* (2006.01)

(52) U.S. Cl.
CPC ..................... *H04L 25/06* (2013.01)

(58) Field of Classification Search
CPC ...... H03K 5/08; H03K 5/19; H04L 25/0272; H04L 25/06
USPC ........ 375/224, 227, 316, 340; 702/1, 57, 64, 702/66, 85
See application file for complete search history.

(56) References Cited

U.S. PATENT DOCUMENTS

| | | | |
|---|---|---|---|
| 6,897,712 B2 * | 5/2005 | Ficken et al. | 327/537 |
| 7,659,777 B2 | 2/2010 | Fujino et al. | |
| 2004/0234015 A1 * | 11/2004 | Janapaty et al. | 375/350 |
| 2006/0238250 A1 * | 10/2006 | Camagna et al. | 330/253 |
| 2007/0271054 A1 * | 11/2007 | Chen et al. | 702/85 |
| 2011/0181361 A1 * | 7/2011 | Nolan et al. | 330/278 |

\* cited by examiner

*Primary Examiner* — Freshteh N Aghdam

(57) ABSTRACT

A method for offset cancellation in a receiver loss of signal (RxLOS) circuit of a serializer/deserializer (SerDes) receiver device includes receiving a differential input signal via the first stage of a peak detector cell of the RxLOS circuit and shorting the differential output of the first stage via a control switch of the second stage of the RxLOS circuit. The control switch may further transition the RxLOS circuit from normal operating mode to an offset cancellation mode wherein the control switch may manually or automatically short the differential output of the first stage.

19 Claims, 6 Drawing Sheets

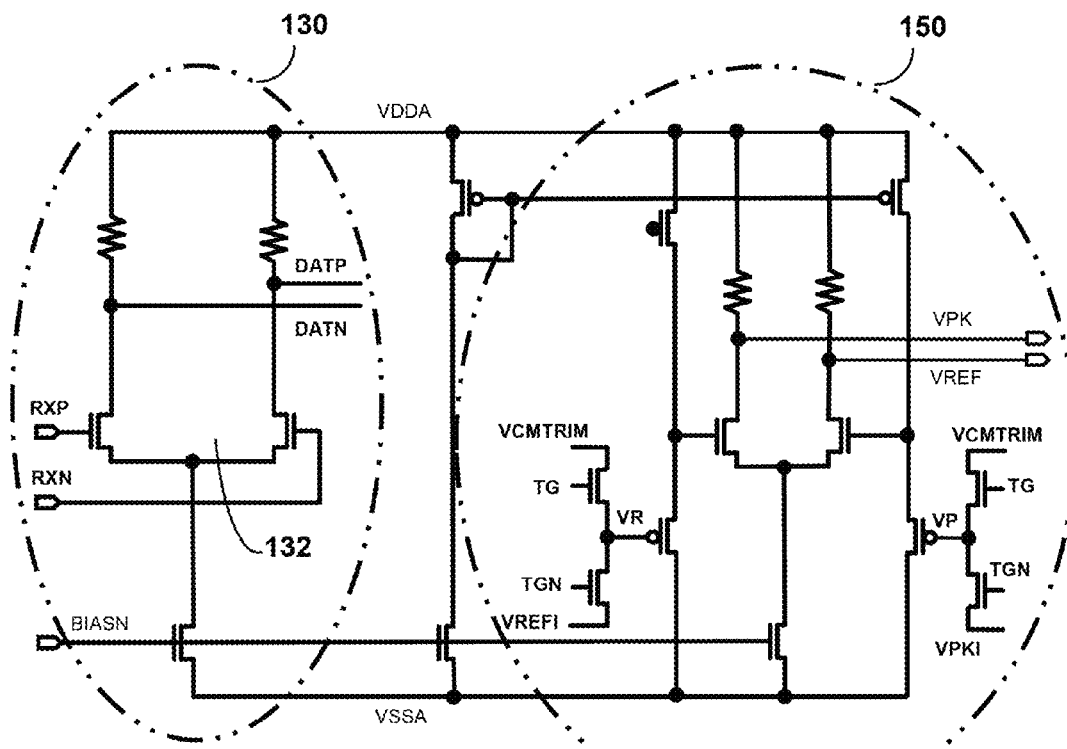
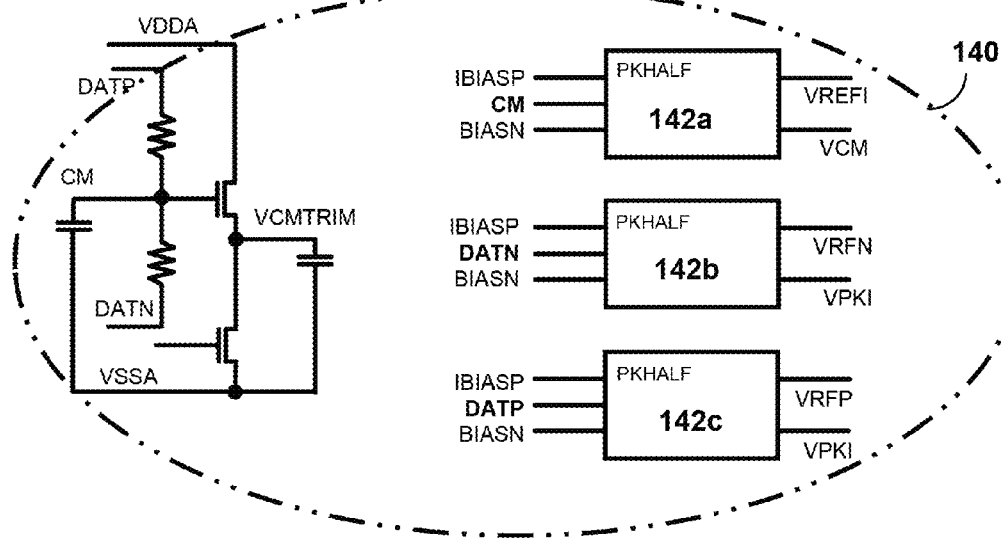
FIG. 2—PRIOR ART

*FIG. 3—PRIOR ART*
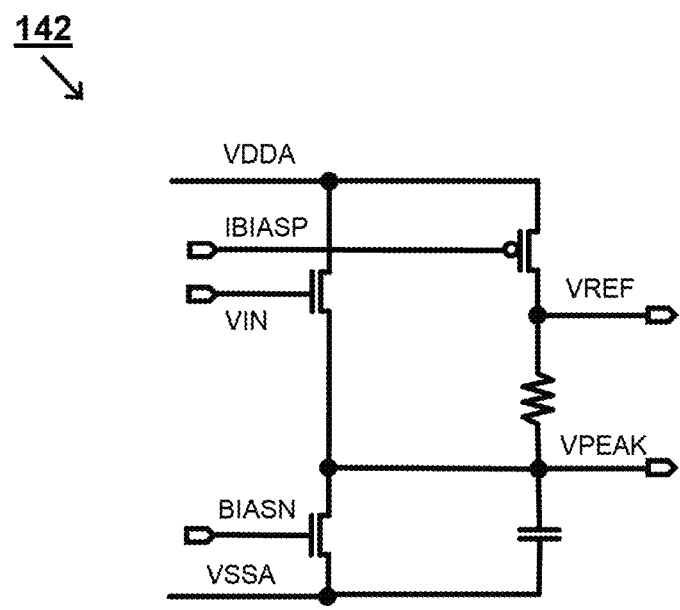

*FIG. 5*

| Case | 3-Sigma value of output offset (mV) | | |
|---|---|---|---|
| | Original | Short-Input | Proposed |
| 125C/0.9V | 31.9 | 39.9 | 39.8 |
| 0C/0V | 28.3 | 34.7 | 34.7 |

SIMPLIFIED AND EFFECTIVE OFFSET CALIBRATION CIRCUIT FOR RXLOS IN SERDES

CROSS-REFERENCE TO RELATED APPLICATIONS

This application claims priority under 35 U.S.C. §119(e) to provisional patent application U.S. Ser. No. 61/985,206 filed on Apr. 28, 2014. Said application is hereby incorporated by reference herein in its entirety.

TECHNICAL FIELD

The invention generally relates to the field of high speed serial communications, and particularly to offset calibration for a receiver loss of signal (RxLOS) in a serializer/deserializer (SerDes) receiver device.

BACKGROUND

The Receiver Loss of Signal (RxLOS) signal is an output of the analog signal detection circuit in a typical serializer/deserializer (SerDes) device core that indicates loss of signal at the SerDes receiver. The RxLOS signal may either switch between logic-one and logic-zero for a short period or remain at either value for an extended period. Active glitches may lead to indicating an erroneous loss of signal condition or erroneous recovery of a lost signal. Input signals affected by inter-symbol interference or channel noise may complicate returning an accurate loss of signal. Correction or calibration of offset error in the RxLOS signal is therefore common.

Offset calibration is generally performed in the peak detector (PKDET) cell of the RxLOS circuit. When the RxLOS circuit is in operating mode, the PKDET cell provides input to a comparator. The PKDET cell compares the received peak voltage with a known reference voltage (ex.—threshold voltage) and the comparator makes a decision (logic-zero or logic-one) with respect to the calibrated signal. The offset of the PKDET cell will affect the decision made by the comparator. It may therefore be desirable to provide improved signal offset calibration while conserving space by utilizing a more compact and cost-efficient circuit.

SUMMARY

Accordingly, an embodiment of the disclosure is directed to a method for cancelling offset in a receiver loss of signal (RxLOS) circuit for a serializer/deserializer (SerDes) receiver device. In embodiments, the method comprises: switching the receiver loss of signal circuit from an operating mode to an offset calibration mode; receiving a differential input signal through a first stage; shorting the first differential output signal of the first stage to generate a second differential output signal and a common mode voltage; and switching the receiver loss of signal circuit from a calibration mode to an operating mode.

A further embodiment of the disclosure is directed to a peak detector cell including: a first stage including circuitry configured to receive at least one first differential input signal and to generate at least one first differential output signal, a second stage including at least one control switch configured to short the at least one first differential output signal and to generate at least one of a second differential output signal and a common mode voltage; and a third stage including circuitry configured to receive the at least one second differential output signal and to generate at least one third differential output signal.

A still further embodiment of the disclosure is directed to a serializer-deserializer (SerDes) receiver device including receiver loss of signal (RxLOS) circuitry, the circuitry including: a first stage including circuitry configured to receive at least one first differential input signal and generate at least one first differential output signal, a second stage including at least one control switch configured to short the at least one first differential output signal and generate at least one of a second differential output signal and a common mode voltage; and a third stage including circuitry configured to receive the at least one second differential output signal and generate at least one third differential output signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which:

FIG. 2 is a schematic diagram of a PKDET cell in a RxLOS circuit;

FIG. 3 is a schematic diagram of a source follower of a PKDET cell;

FIG. 5 is a table showing simulation results of various RxLOS offset calibration methods.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

Figure 1:
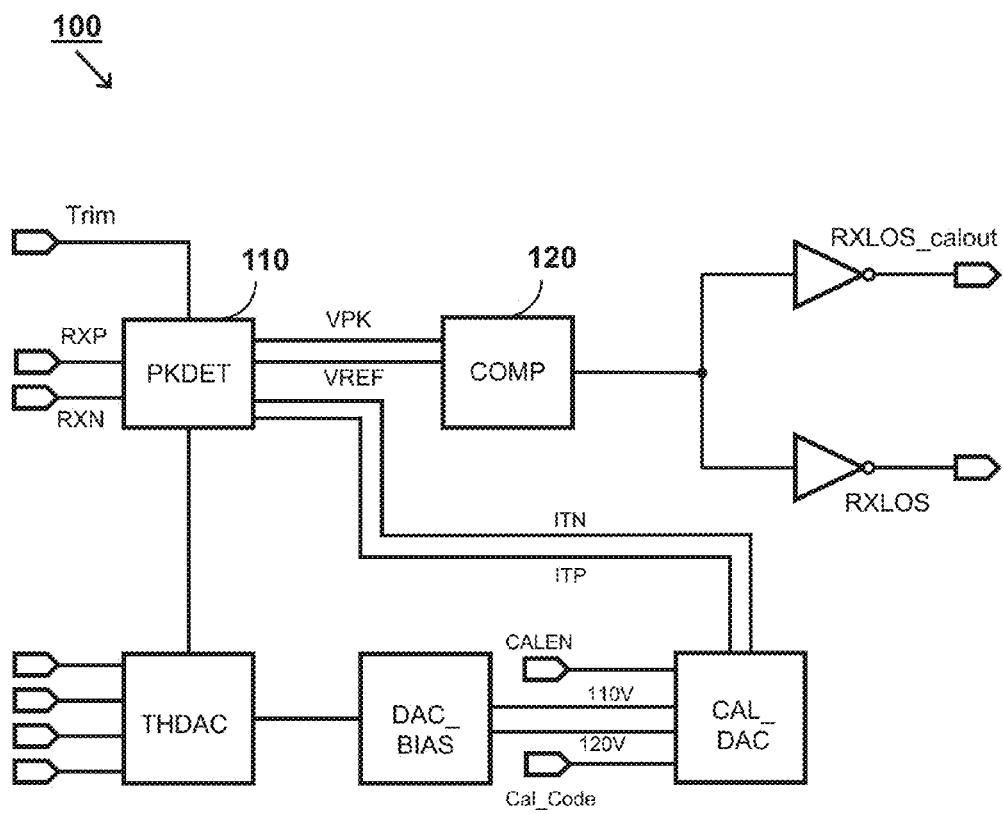
FIG. 1 is a schematic diagram of a RxLOS circuit.

FIG. 1 illustrates a receiver loss of signal (RxLOS) circuit 100 of a serializer/deserializer (SerDes) receiver device. The RxLOS circuit 100 may be set either to normal operating mode or to offset calibration mode. When the RxLOS circuit 100 is in normal operating mode, peak detector (PKDET) cell 110 can receive a differential input signal RXP/RXN representing the RxLOS signal. The precise signal pattern may vary depending on the specified application and protocol (e.g., SATA, SAS, FC, Ethernet). The PKDET cell 110 can then compare received peak voltage with a known reference voltage and provide preliminary output VPK, VREF to the comparator cell 120. The comparator 120 can then make a decision (logic one or logic zero) with respect to the RxLOS signal. While the PKDET cell 110 is the first stage of the RxLOS circuit 100, mismatched components of the PKDET cell 110 can lead to signal offset which must be calibrated (ex.—cancelled out) for an optimal RxLOS signal. Therefore the RxLOS circuit 100 can generally be switched to an offset calibration mode during the power-up phase of the receiver device.

FIG. 2 illustrates a PKDET cell 110 of an RxLOS circuit 100 incorporating conventional offset calibration and the three main stages 130, 140, 150 of the PKDET cell 110. When the RxLOS circuit 100 is set to offset calibration mode, conventional offset calibration is generally performed only at the third stage 150 of the PKDET cell 110. First stage 130 includes a differential amplifier 132 with RXP/RXN as input and differential output DATP and DATN. By shorting input signal RXP/RXN (i.e., setting RXP=RXN and input voltage to 0V), offset voltage $V_{OS1}$ can be generated such that $$DATP = DATN + V_{os1}$$

$$DATP = V_{cm} + \frac{V_{os1}}{2}$$

$$DATN = V_{cm} - \frac{V_{os1}}{2}$$

where $V_{cm}$ is the output common mode voltage of the first stage 130. When the RxLOS circuit 100 is set to normal operating mode, control switch TGN shorts VR/VP, the differential input to the third stage 150, to VREFI/VPKI (the output of the second stage 140). When the RxLOS circuit 100 is set to offset calibration mode, control switch TG shorts VR/VP to VCMTRIM, where VCMTRIM is the output of source follower (ex.—metal oxide semiconductor field effect transistor, MOSFET) 142 in second stage 140. Source follower 142a has an input CM, or the output common mode voltage of first stage 130. Therefore, conventional offset calibration mode calibrates the offset of the third stage 150 only; the offset of first stage 130 and second stage 140 are irrelevant.

This conventional technique for RxLOS offset calibration can be improved upon by calibrating signal offset at all three stages of the PKDET cell 110, but there are at least two problems associated with this approach. First, referring to FIG. 2, the second stage 140 of the PKDET cell 110 includes three source followers 142a, 142b, 142c. The inputs to source followers 142b and 142c (apart from bias current IBIASP and BIASN) respectively include DATP and DATN, where DATP/DATN represents the differential output of the first stage 130. If the threshold voltage of each source follower is $V_{th}$, and the square law model for a MOSFET in saturation mode provides that drain current $I_{DS}$ is equal to $$I_{DS} = \frac{\mu C_{ox} W}{2L}(V_{gs} - V_{th})^2$$

it can therefore be deduced that $$V_{REFI} = V_{cm} - V_{th} - \sqrt{\frac{2LI_{DS}}{\mu C_{ox} W}}$$

$$V_{PKI} = DATP - V_{th} - \sqrt{\frac{2LI_{DS_p}}{\mu C_{ox} W}} =$$

$$DATN - V_{th} - \sqrt{\frac{2LI_{DS_n}}{\mu C_{ox} W}} = V_{cm} - V_{th} - \sqrt{\frac{2LI_{DS}}{\mu C_{ox} W}}$$

and that, by comparing the above equations for $V_{REFI}$ and $V_{PKI}$, the offset of first stage 130 (DATP/DATN) has no effect on second stage 140 (e.g., the value of $V_{PKI}$ depends on $V_{cm}$ regardless of whether DATP/DATN is offset).

If the receiver device is in a power-up stage the RxLOS circuit 100 may be switched to offset calibration mode via CMOS switches, either automatically or manually. Then, if CMOS switches are used to switch the RxLOS circuit 100 to offset calibration mode and thereby short the input RXP/RXN of first stage 130 and calibrate the offset of all three stages 130, 140, 150 of the PKDET cell 110, when the RxLOS circuit 100 is switched back to normal operating mode the amplitude of differential input RXP/RXN may be large (e.g., 1600 mVppd) due to the specifications of various applications. The input common mode voltage of input signal RXP/RXN, for example, may be set by the receiver device. A sufficiently large input amplitude (e.g., 1600 mVppd) may induce a very high source voltage (e.g., above 1.2 V) of the 1V PMOS core device of the CMOS switches, while the gate of the PMOS device may be connected to a VDDA supply or regulator output (0.9 V). Therefore, the PMOS device may be in a weak inversion mode where the 0.9 V gate voltage is less than the 1.2 V source voltage, and the resulting leakage current will be too large. Reliability issues with the PMOS core device may also result. This problem can be easily solved by using 1.8 V devices as CMOS switches to short the input RXP/RXN of first stage 130 in offset calibration mode, and connecting the gate of the CMOS switches to a VDDH-level higher supply domain (e.g., 1.8 V). However, this solution also requires the use of level shifters (e.g., from an 0.9 V to a 1.8 V power supply domain) and 1.8 V I/O devices in the PKDET cell 110, which would increase both area and cost.

FIG. 3 depicts the internal circuitry of source followers 142a, 142b, 142c in second stage 140. Input voltage VIN may consist of a different input for each source follower (common mode voltage CM for source follower 142a, first stage differential output DATN/DATN for source followers 142b and 142c), as will source follower outputs consisting of a peak voltage VPEAK and a reference voltage VREF.

Figure 4:
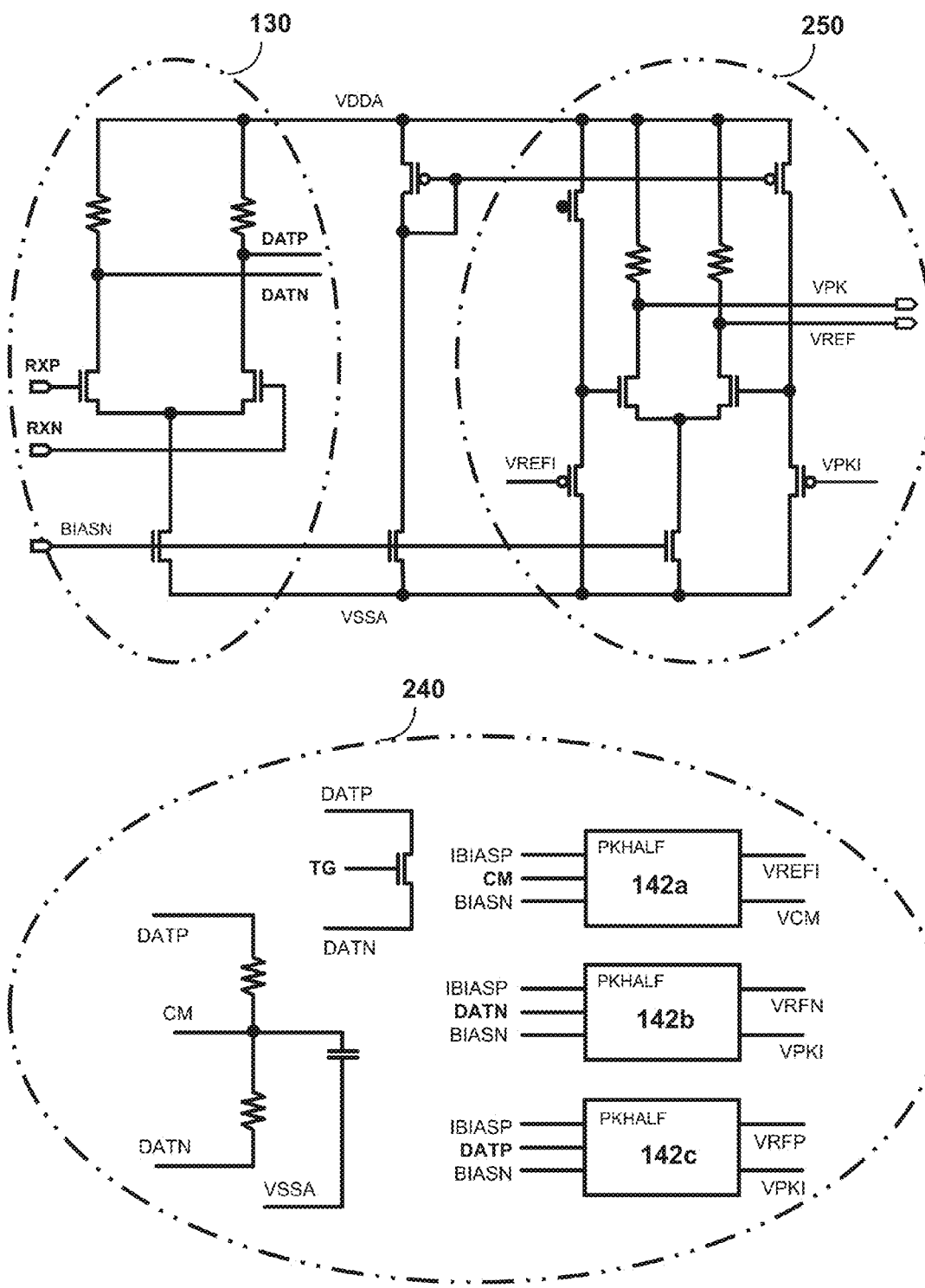
FIG. 4 is a schematic diagram of a reconfigured PKDET cell in a RxLOS circuit according to an embodiment of the invention.

FIG. 4 illustrates an embodiment of a reconfigured PKDET cell 210 of the RxLOS circuit 100 incorporating simplified offset calibration circuitry according to the invention. In embodiments, the PKDET cell 210 may incorporate a single offset calibration control switch TG in its second stage 240. In embodiments, control switch TG may include a CMOS switch. In embodiments, control switch TG may transition the RxLOS circuit 100 between normal operating mode (ex.—switch in OFF mode with respect to offset calibration) and offset calibration mode (ex.—switch in ON mode), and short the differential output DATP/DATN of first stage 130. In embodiments, shorting the output DATP/DATN of the first stage 130 may achieve offset calibration superior to a conventional approach which calibrates only the offset of the third stage 250, and comparable to short-input offset calibration which calibrates the offset of all three stages, while utilizing a smaller and more cost-effective calibration circuit. In embodiments, offset calibration may take place automatically when RxLOS circuit 100 is switched to offset calibration mode. In some embodiments, control switch TG may automatically switch the RxLOS circuit 100 to offset calibration mode and perform offset calibration during the receiver power-up phase.

FIG. 5 illustrates simulation results for offset calibration in embodiments of RxLOS circuit 100 using a PMC Monte Carlo analysis of 200 runs. The leftmost column A shows results for the conventional third-stage offset calibration depicted in FIG. 2, while the center column B shows results for short-input offset calibration. The rightmost column C shows results for an embodiments of a RxLOS circuit incorporating simplified offset calibration according to the invention, indicating performance comparable to short-input offset calibration at reduced area and cost.

Figure 6:
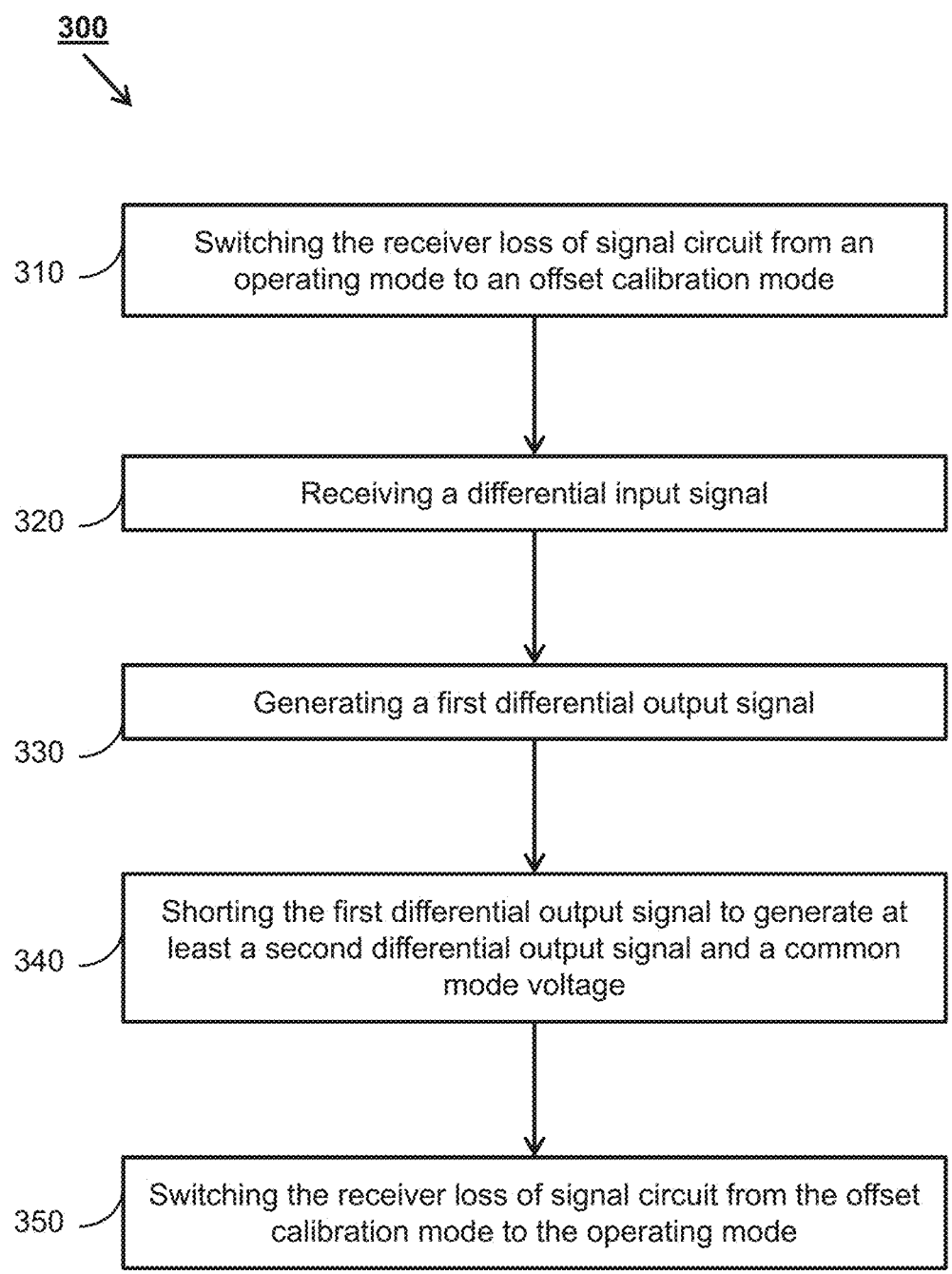
FIG. 6 is a process flow diagram illustrating a method according to an embodiment of the invention.

FIG. 6 illustrates a process flow diagram of a method 300 for cancelling offset in a differential signal via a RxLOS circuit 100. It is noted herein that the method 300 may be carried out utilizing any of the embodiments described previously. It is further noted, however, that method 300 is not limited to the components or configurations described previously as multiple components and/or configurations may be suitable for executing method 300.

At step 310, the method 300 switches the receiver loss of signal circuit from an operating mode to an offset calibration mode. In some embodiments, receiving a differential input signal may include receiving a differential input signal through a differential amplifier. At step 320, the method 300 receives a differential input signal. At step 330, the method 300 generates a first differential output signal. At step 340, the method 300 shorts the first differential output signal to generate at least a second differential output signal and a common mode voltage. At step 350, the method 300 switches the RxLOS circuit from the offset calibration mode to the operating mode. In some embodiments, the method 300 may be embodied in an RxLOS circuit of a SerDes receiver device.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A method for cancelling offset in a differential signal via a receiver loss of signal (RxLOS) circuit, the method comprising:
   switching the receiver loss of signal circuit from an operating mode to an offset calibration mode;
   receiving a differential input signal;
   generating a first differential output signal that is different form the differential input signal;
   shorting the first differential output signal to generate at least a second differential output signal and a common mode voltage; and
   switching the receiver loss of signal circuit from the offset calibration mode to the operating mode.

2. The method of claim 1, wherein the receiving a differential input signal includes
   receiving a differential input signal through a differential amplifier.

3. The method of claim 1, wherein the method is embodied in a serializer/deserializer (SerDes) receiver device incorporating the RxLOS circuit.

4. The method of claim 3, wherein the method is embodied in an activation phase of the receiver device.

5. A peak detector cell, comprising:
   a first stage including circuitry configured to receive at least one differential input signal and to generate at least one first differential output signal that is different from the differential input signal;
   a second stage including at least one control switch configured to short the at least one first differential output signal and to generate at least a second differential output signal and a common mode voltage; and
   a third stage including circuitry configured to receive the at least one second differential output signal and to generate at least one third differential output signal that is different from the second differential output signal.

6. The peak detector cell of claim 5, wherein the at least one differential input signal corresponds to a receiver loss of signal (RxLOS) signal.

7. The peak detector cell of claim 5, wherein the at least one differential input signal is received through a differential amplifier.

8. The peak detector cell of claim 5, wherein the at least one control switch includes at least one of a single-type metal oxide semiconductor field effect transistor (MOSFET) switch and a dual-type MOSFET switch.

9. The peak detector cell of claim 5, wherein the peak detector cell is embodied in a receiver loss of signal (RxLOS) circuit.

10. The peak detector cell of claim 9, wherein the RxLOS circuit is embodied in a serializer/deserializer (SerDes) receiver device.

11. The peak detector cell of claim 9, wherein the at least one control switch is further configured to transition the RxLOS circuit between a normal operating mode and an offset calibration mode wherein the at least one control switch is configured to short the first differential output signal.

12. The peak detector cell of claim 5, wherein the at least one third differential output signal includes at least one of a peak voltage and a reference voltage.

13. A serializer-deserializer (SerDes) receiver device including receiver loss of signal (RxLOS) circuitry, the circuitry comprising:
- a first stage including circuitry configured to receive at least one differential input signal and generate at least one first differential output signal that is different from the differential input signal;
- a second stage including at least one control switch configured to short the at least one first differential output signal and generate at least one of a second differential output signal and a common mode voltage; and
- a third stage including circuitry configured to receive the at least one second differential output signal and generate at least one third differential output signal that is different from the second differential output signal.

14. The receiver device of claim 13, wherein the at least one differential input signal is a receiver loss of signal (RxLOS) signal.

15. The receiver device of claim 13, wherein at least one of the first stage, the second stage, and the third stage are included in a peak detector cell.

16. The receiver device of claim 13, wherein the at least one differential input signal is received through a differential amplifier.

17. The receiver device of claim 13, wherein the at least one control switch includes at least one of a single-type MOSFET switch and a dual-type MOSFET switch.

18. The receiver device of claim 13, wherein the at least one control switch is further configured to transition the circuit between a normal operating mode and an offset calibration mode wherein the at least one control switch is configured to short the first differential output signal.

19. The receiver device of claim 13, wherein the third differential output signal includes at least one of a peak voltage and a reference voltage.

* * * * *